(12) United States Patent
Kimishima

(10) Patent No.: US 7,025,100 B2
(45) Date of Patent: Apr. 11, 2006

(54) PNEUMATIC TIRE INCLUDING BLOCKS AND SPLITTING GROOVES

(75) Inventor: Sonoko Kimishima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 89 days.

(21) Appl. No.: 10/434,268

(22) Filed: May 9, 2003

(65) Prior Publication Data

US 2003/0226629 A1    Dec. 11, 2003

(30) Foreign Application Priority Data

May 9, 2002    (JP) .............................. 2002-134426

(51) Int. Cl.
   *B60C 11/12*    (2006.01)
   *B60C 103/00*    (2006.01)
   *B60C 107/00*    (2006.01)

(52) U.S. Cl. .......................... 152/209.18; 152/209.22; 152/209.27; 152/DIG. 3

(58) Field of Classification Search ............. 152/209.1, 152/209.2, 209.18, 209.22, 209.27, 902, 152/903, DIG. 3

See application file for complete search history.

(56) References Cited

U.S. PATENT DOCUMENTS

| | | | | |
|---|---|---|---|---|
| 4,815,512 A | * | 3/1989 | Gerresheim et al. ... | 152/209.18 |
| 5,088,536 A | * | 2/1992 | Graas et al. ................. | 152/902 |
| 5,109,903 A | * | 5/1992 | Watanabe et al. ........... | 152/903 |
| 5,308,416 A | * | 5/1994 | Baumhofer et al. ... | 152/209.27 |
| 5,526,860 A | * | 6/1996 | Minami .................. | 152/209.27 |
| 6,415,834 B1 | * | 7/2002 | Carra et al. ............ | 152/209.27 |
| 6,739,364 B1 | * | 5/2004 | Tsuda .................... | 152/209.16 |

FOREIGN PATENT DOCUMENTS

| | | | |
|---|---|---|---|
| EP | 0 599 566 A | | 1/1994 |
| EP | 654365 | * | 5/1995 |
| EP | 0 887 209 A | | 12/1998 |
| JP | 8-183312 | * | 7/1996 |
| JP | 11-245625 | * | 9/1999 |
| JP | 2001-039123 A | | 2/2001 |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire is provided in the tread portion with a circumferential row of middle tread elements, wherein each of the middle tread elements is divided into four elemental blocks having different configurations, by three splitting grooves, and the three splitting grooves are: a longitudinal splitting groove extending between the lateral grooves; an axially inner lateral splitting groove extending axially outwardly from the axially inner circumferential main groove beyond the longitudinal splitting groove and terminating before the axially outer circumferential main groove; and an axially outer lateral splitting groove extending axially inwardly from the axially outer circumferential main groove beyond the longitudinal splitting groove and terminating before the axially inner circumferential main groove.

9 Claims, 3 Drawing Sheets

PNEUMATIC TIRE INCLUDING BLOCKS AND SPLITTING GROOVES

BACKGROUND OF THE INVENTION

1. Field of the Invention

The present invention relates to a pneumatic tire, more particularly to an improved tread pattern suitable for driving on highway as much as off-highway driving.

2. Description of the Related Art

In recent years, 4WD vehicles are a favorite as a town-use car and also 4WD-type recreational vehicles become popular. Thus, such vehicles have a number of occasions for driving on highway as much as off-highway driving.

In order that the 4WD vehicle tire fulfills its original function, namely, traction or road grip on soft terrain, mudy road, snowy road and the like, the tread pattern is desired to have a large grooved area. Conventionally, the tread portion is provided with wide circumferential grooves and wide axial grooves to form generally square tread blocks. However, such tires have disadvantages when driving on highway, that is to say, loud noise is generated during running on the well paved roads.

The noise includes so called: impact sound heard when the tread blocks impact the road surface; pumping sound heard when the air in the center region of the ground contacting patch jets out toward both sides of the tire through the lateral grooves; and resonance sound heard when the air in the wide circumferential groove in the ground contacting patch is excited by the pumping sound and vibrations of the tread rubber and as a result a resonance at a certain frequency is caused.

If the grooved area is decreased and the lateral grooves are inclined, then the noise resulting from the resonance sound, pumping sound and impact sound can be reduced, but wet performance such as aquaplaning resistance is deteriorated. If the size of middle tread blocks, which are disposed in a middle tread region where vibrations are liable to occur, is increased, then the resonance sound excited by the vibrations can be reduced, but wet performance and bad road traction/grip are deteriorated.

SUMMARY OF THE INVENTION

It is therefore an object of the present invention to provide a pneumatic tire, in which the noise performance and wet performance during driving on highway are improved, while maintaining the original function of a 4WD vehicle tire for off-highway driving.

According to the present invention, a pneumatic tire comprises a tread portion provided between an axially inner circumferential main groove and an axially outer circumferential main groove with a circumferential row of middle tread elements which are circumferentially divided by lateral main grooves, wherein the axially inner circumferential main groove is disposed in a tread center zone having a width of 30% of a ground contacting width between tread edges, and the axially outer circumferential main groove is disposed outside the tread center zone, each of the middle tread elements divided into four elemental blocks having different configurations, by three splitting grooves which are: a longitudinal splitting groove extending between the lateral grooves; an axially inner lateral splitting groove extending axially outwardly from the axially inner circumferential main groove beyond the longitudinal splitting groove and terminating before the axially outer circumferential main groove; and an axially outer lateral splitting groove extending axially inwardly from the axially outer circumferential main groove beyond the longitudinal splitting groove and terminating before the axially inner circumferential main groove.

BRIEF DESCRIPTION OF THE DRAWING FIGURES

Embodiments of the present invention will now be described in detail in conjunction with the accompanying drawings.

FIG. 2(*b*) is a schematic view of the middle tread element showing the circumferential ranges in which lateral splitting grooves are disposed.

DETAILED DESCRIPTION

According to the present invention, a pneumatic tire comprises a tread portion 2 provided with tread grooves including main grooves 3, 4, 5 and 11, a pair of axially spaced bead portions, a pair of sidewall portions, a carcass extending between the bead portions, and a tread reinforcing belt structure.

Figure 1:
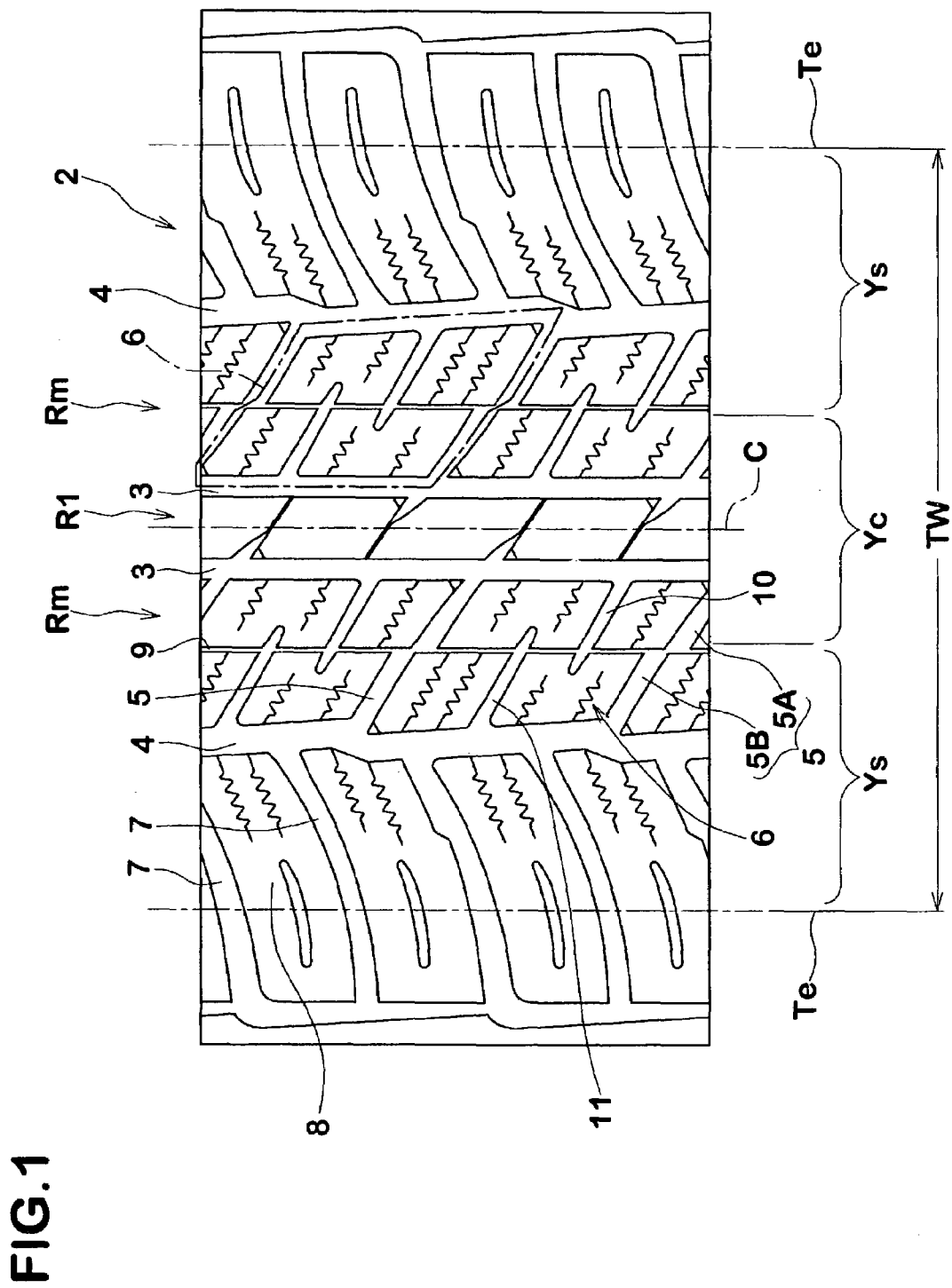
FIG. 1 is a developed partial plan view of a pneumatic tire according to the present invention showing an example of the tread pattern thereof.

FIG. 1 shows an example of the tread pattern designed for a mud and snow radial tire for 4WD-type recreational vehicles. The negative ratio thereof is preferably set in the range of 30 to 35%.

In the drawings, the tread portion 2 is provided on each side of the tire equator C with a circumferential row Rm of middle tread elements 6. The middle tread elements 6 in a row Rm are defined as being circumferentially divided from each other by the lateral main grooves 5 and as being axially divided from other elements by the circumferential main grooves 3 and 4.

The axially inner circumferential main groove 3 is disposed within a tire equatorial zone or tread center zone Yc whose width is 30% of the ground contacting width TW between the tread edges Te. In this example, two grooves 3 are provided one on each side of the tire equator, but it is also possible to provide only one groove 3 anywhere within the zone Yc, for example on the tire equator C. Further, it is also possible to provide an additional circumferential main groove between the two grooves 3.

The axially outer circumferential main groove 3 is disposed in a tread lateral zone Ys (35% of TW) on each side of the tread center zone Yc, and defined as being next to the groove 3.

The groove width W3, W4 of the circumferential main groove 3,4 is more than 2.0 mm preferably more than 5.0 mm for drainage. In this example, in order to effectively remove the water in the tire equatorial zone and also to improve steering stability, the axially inner groove 3 has a groove width W3 of 5.0 to 7.0 mm and extends straight in parallel with the tire circumferential direction, and the possible resonance sound is prevented from leaking out by the undermentioned lateral groove arrangement.

The axially outer groove 4 has a groove width W4 of 7.0 to 9.5 mm. The width W3 is set to be narrower than the width W4 to improve the steering stability (handle response) during straight running. In order to prevent the occurrence of air resonance and also to improve snow performance, a zigzag configuration is used, which is made up of alternate long inclined parts 4A and short reversely-inclined parts 4B, wherein the long inclined parts 4A are inclined at an angle α of from 3 to 10 degrees with respect to the circumferential direction. If less than 3 degrees, it is difficult to prevent resonance. If more than 10 degrees, the drainage deteriorates.

Usually, the circumferential main grooves 3 and 4 have groove depths H3 and H4, respectively, of from 8.0 to 11.0 mm.

Here, the "ground contacting width TW" means the axial width of the ground contacting region under such a condition that the tire is mounted on a standard rim and inflated to a standard pressure, and then loaded with a standard load. The "standard rim" is a wheel rim officially approved for the tire by a standard organization, i.e. JATMA (Japan and Asia), T&RA (North America), ETRTO (Europe), STRO (Scandinavia) and the like, namely, "Standard rim" in JATMA, "Design Rim" in TRA, "Measuring Rim" in ETRTO and the like.

The standard pressure is the "maximum air pressure" in JATMA, the "Inflation Pressure" in ETRTO, the maximum pressure given in the "Tire Load Limits at various cold Inflation Pressures" table in TRA or the like. In case of passenger car tires, however, 180 kPa is used as the standard pressure.

The standard load is the "maximum load capacity" in JATMA, the "Load Capacity" in ETRTO, the maximum value given in the above-mentioned table in TRA or the like. In case of passenger car tires, however, 88% of such specified load is used as the standard load.

Figure 2A:
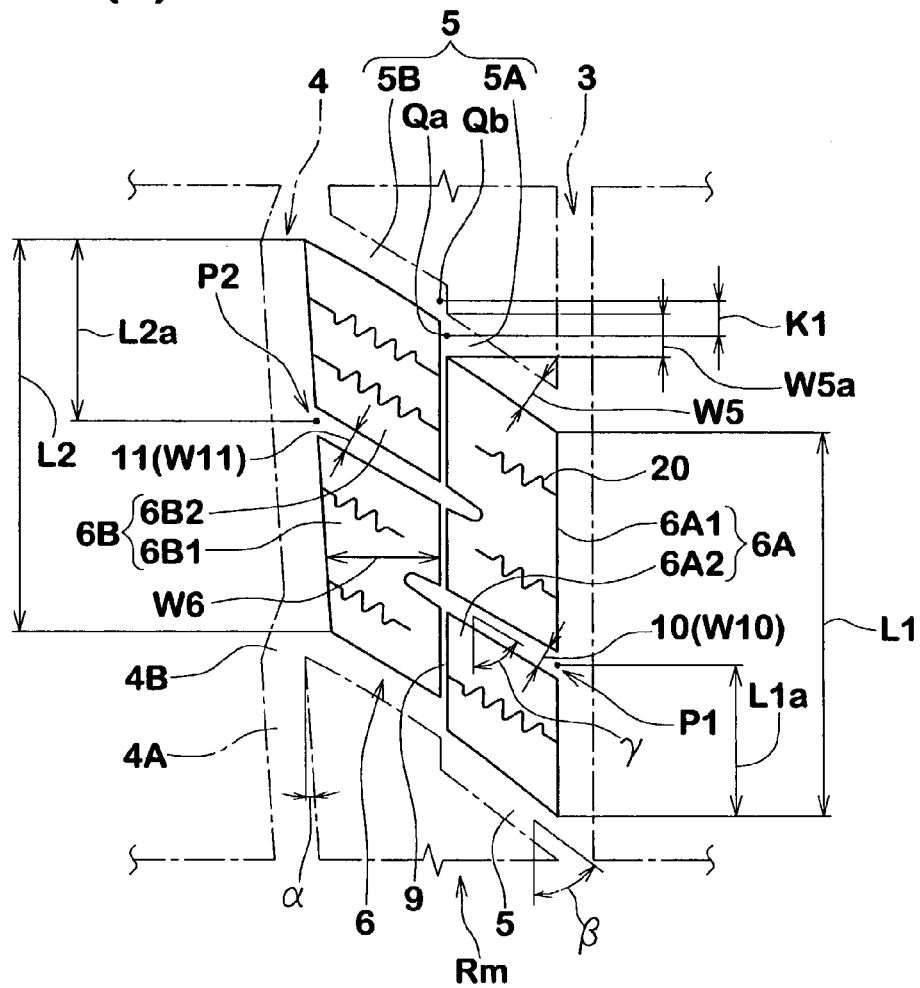
FIG. 2(*a*) is an enlarged view showing a middle tread element thereof.

AS shown in FIG. 2(a), the middle tread element 6 consists of four elemental blocks 6A1, 6A2, 6B1 and 6B2 divided by splitting grooves 9, 10 and 11 to have different shapes. The division into different shapes can suppress vibrations of the part of the tread portion where the elemental blocks are disposed, and lowers the resonance sound.

The splitting grooves 9, 10 and 11 are a longitudinal splitting groove 9 and two lateral splitting grooves 10 and 11.

The longitudinal splitting groove 9 extends between the lateral main grooves 5. In this example, the longitudinal splitting groove 9 is a straight groove extending in parallel with the tire circumferential direction, and the longitudinal splitting groove 9 is shallower and narrower than the circumferential main grooves.

The groove width W9 of the longitudinal splitting groove 9 is set to be not more than 2.0 mm to avoid air resonance, and the groove depth H9 is preferably set in the range of from 50 to 70% of the depth H3 of the circumferential main groove 3 to provide a certain degree of association between the axially inner split part 6A and the axially outer sprit part 6B of the middle tread element 6.

The axially inner lateral splitting groove 10 extends from the axially inner circumferential main groove 3 toward the axially outer circumferential main groove 4 beyond the longitudinal splitting groove 9 but terminates before the axially outer circumferential main groove 4.

The axially outer lateral splitting groove 11 extends from the axially outer circumferential main groove 4 towards the axially inner circumferential main groove 3 beyond the longitudinal splitting groove 9 but terminates before the axially inner circumferential main groove 3.

By the splitting grooves 9, 10 and 11, the four elemental blocks 6A1, 6A2, 6B1 and 6B2 are divided to have different shapes and sizes.

In respect of the circumferential length of each of the elemental blocks, the axially inner elemental block 6A is longer than the axially inner elemental block 6A2, and the axially outer elemental block 6A1 is longer than the axially outer elemental block 6B2. The lengths have the following relationship: 6A1>6A1>6B2>6A2.

The longest block 6A1 and shortest block 6A2 are disposed on the axially inside of the longitudinal splitting groove 9. The second longest block 6A1 and the second shortest block 6B2 are disposed on the axially outside of the longitudinal splitting groove 9. The shortest block 6A2 adjoins the second longest block 6A1, and the second shortest block 6B2 adjoins the longest block 6A1. Thus, the order in clockwise around the tread element center is longest, shortest, second longest and second shortest.

As to the configurations or shapes on the tread face, each of the four elemental blocks 6A1, 6A2, 6A1 and 6B2 is made generally parallelogram by the following lateral groove arrangement to reduce the impact sound.

The above-mentioned lateral main grooves 5 are all inclined in one direction at an angle β of from 25 to 45 degrees with respect to the tire circumferential direction.

The lateral splitting grooves 10 and 11 are also all inclined in one direction which is the same as the lateral main grooves 5, at an angle γ of from 25 to 45 degrees with respect to the tire circumferential direction. In this example, the angle γ is the substantially same as the angle β, and both are substantially constant along the length. However, if the angle β varies along the groove, the angle γ can be varied correspondingly.

The groove width W5 of the lateral main grooves 5 is set to be more than 2.0 mm for drainage. In order to reduce the pumping sound without deteriorating the drainage, preferably, the groove width W5 is set to be not more than the groove width W3 of the circumferential main groove 3, and the groove depth H5 is set in the range of from 50 to 70% of the groove depth H3 of the circumferential main groove 3.

In this example, to enhance the pumping sound reducing effect and also to reduce the impact sound, the lateral main grooves 5 include circumferentially shifted axially inner groove 5A and axially outer groove 5B. The axially inner groove 5A extends between the grooves 3 and 9, and the axially outer groove 5B extends between the grooves 4 and 9.

At the intersecting points Qa and Qb of the groove 5A and 5B with the narrow longitudinal splitting groove 9, the groove 5A and groove 5B are circumferentially shifted from each other, and the circumferential shift K1 is preferably set in the range of 50 to 90% of the circumferential width W5a of the groove 5 (5A, 5B). If the shift is less than 50%, it is difficult to reduce the pumping sound. If the shift is more than 90%, it is difficult to provide the minimum drainage.

In other words, at the junction of the two grooves 5A and 5B, they are circumferentially shifted from each other, to form a narrow orifice whose width corresponds to 50 to 10% of the width W5a.

In this example, the lateral main grooves 5 are connected to and opened to the short reversely-inclined parts 4B of the zigzagged axially outer circumferential main groove 4. The width of the opening is the almost same as the length of the short reversely-inclined part 4B. Therefore, the axially outer blocks 6A1 and 6B2 are aligned with one of the long inclined parts 4A as shown in FIG. 2(a). As a result, the axial width W6 of the axially outer two blocks 6B3 and 6B2 (collectively the axially outer part 6B) which width is defined between the inclined groove part 4A and groove 9, progressively increases in one circumferential direction from the block 6A1 to the shorter block 6B2. Contrary, the axial width of the axially inner two blocks 6A and 6A2 (collectively the axially inner part 6A), which width is defined between the grooves 3 and 9, is constant in the circumferential direction from the block 6A2 to the longer block 6A. This arrangement also helps to improve the impact sound and traction/grip performance.

In order to achieve the above-described length relationship (6A1>6B1>6B2>6A2), the axially inner lateral splitting groove 10 and axially outer lateral splitting groove 11 are circumferentially shifted, based on the circumferentially shifted lateral main grooves 5A and 5B.

Figure 2B:
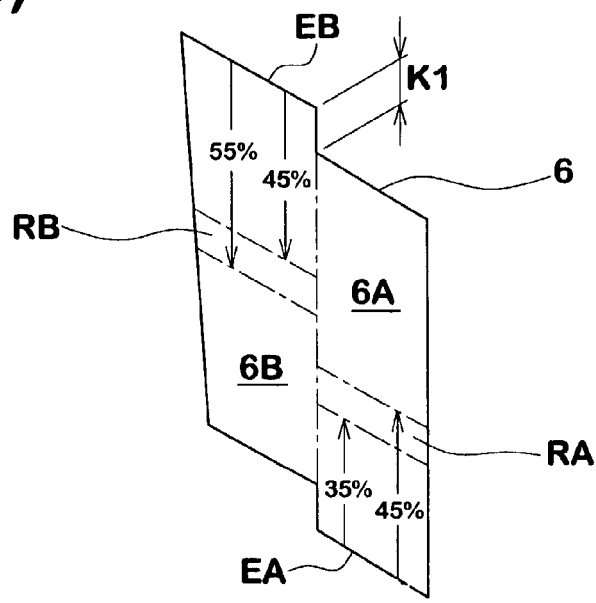
Figure 3:
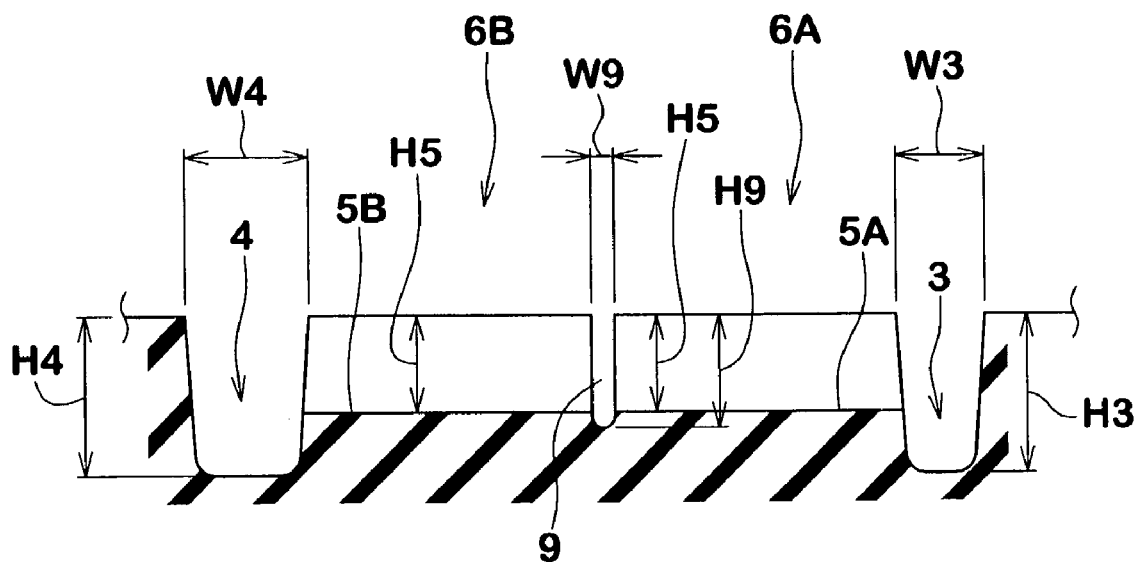
FIGS. 3 and 4 are sectional views showing an example of the arrangement of the depths and widths of the tread grooves thereof.
Figure 4:
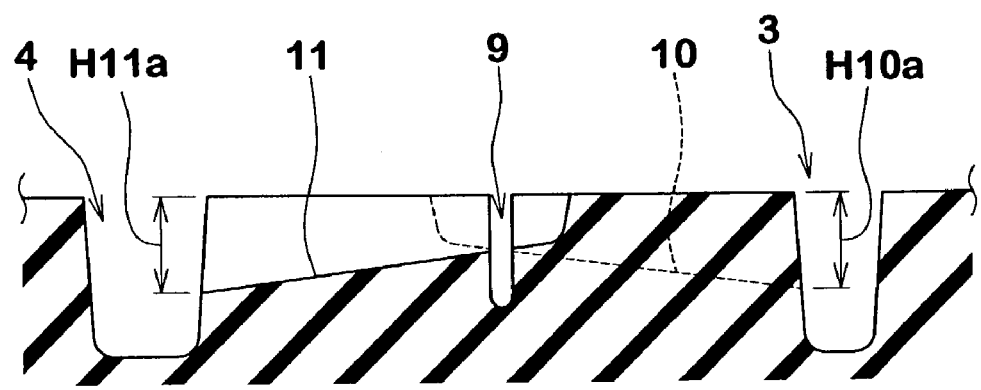

AS shown in FIGS. 2(a) and 2(b), the axially inner lateral splitting groove 10 is positioned in a circumferential range RA between 35% and 45% of the axially inner part 6A from the circumferential edge EA on the shorter block side, namely, the shortest block 6A2 side. The axially outer lateral splitting groove 11 is positioned in a circumferential range RB between 45% and 55% of the axially outer part 6B from the circumferential edge EB on the shorter block side, namely, the second shortest block 6B2 side.

More specifically, in case of the example shown in FIG. 2(a), the grooves 10 and 11 are located to satisfy the following relationships:

$L1a/L1 = 0.35$ to $0.45$ $L2a/L2 = 0.45$ to $0.55$ $L1a/L1 \neq L2a/L2$ wherein L1 is the circumferential distance between the circumferential edges of the axially inner part 6A, L1a is the circumferential distance between the intersecting point P1 of the axially inner lateral splitting groove 10 with the axially inner circumferential main groove 3 and one of the circumferential edges of the axially inner part 6A nearer to the intersecting point P1 than the other, L2 is the circumferential distance between the circumferential edges of the axially outer part 6B, L2a is the circumferential distance between
the intersecting point P2 of the axially outer lateral splitting groove 11 with the axially outer circumferential main groove 4 and
one of the circumferential edges of the axially outer part 6B nearer to the intersecting point P2 than the other.

If the ratios L1a/L1 and L2a/L2 are less than the respective lower limits 0.35 and 0.45, uneven wear becomes liable to occur on the elemental blocks. If the ratios L1a/L1 and L2a/L2 are more than the respective upper limits 0.45 and 0.55, noise performance deteriorates.

In this example, in order to provide a good drainage, the groove width W10, W11 of the lateral splitting groove 10, 11 is set to be the almost same as or slightly smaller than the groove width W5 of the lateral main grooves 5 at the open end of the groove 10, 11 at the circumferential main groove 3, 4. For example the width W10, W11 is set in the range of 4.0 to 7.0 mm. Further, the groove width W10, W11 in this example is gradually decreased from the open end to the closed end.

For the same reason, the groove depth H10, H11 of the lateral splitting groove 10, 11 is substantially the same as the groove depth H5 of the lateral main grooves 5, at the open end of the groove 10, 11 at the circumferential main groove 3, 4. Further, the groove depth H10, H11 in this example is gradually decreased from the open end to the closed end in order to provide rigidity for the middle tread element 6 as a collective of the elemental blocks. More specifically,
the groove depth H10, H11 is 6.0 to 7.0 mm at the open end
and 3.0 to 5.0 mm near the closed end.

In this embodiment, in order to improve uneven wear of the elemental blocks 6A1, 6A2, 6B1 and 6B2, each blocks is provided with at least one sipe 20 which extends across over 50% of the axial width of the elemental block. As to the number of the sipe 20, it is preferable that the shortest block 6A2 is less than the longest block 6A1 in order to even the block rigidity. In the example shown in the drawings, the sipe numbers of the elemental blocks 6A1, 6A2, 6B1 and 6B2 are two, one, two and two, respectively.

Each of the sipes 20 is a zigzag sipes extending from the circumferential main groove 3, 4 and terminating in the elemental block to have a closed end and an open end. However, the sipe 20 may be extended across the entire width of the elemental block to have both ends opened. Further, a straight sipe may be used instead of or in combination with the zigzag sipe.

In this embodiment, the tread grooves further include lateral main grooves 7. The lateral main grooves 7 extend axially outwardly from the axially outer circumferential man grooves 3 beyond the tread edges Te, thereby forming shoulder blocks or axially outmost tread elements 8. The shoulder blocks are also provided with zigzag sipes.

On the other hand, between the axially inner circumferential main grooves 3, a single rib or circumferentially continuous tread element is formed. The rib R1 is provided with only straight sipes or very fine grooves inclined in the substantially same direction as the lateral main grooves 5. Thus, the rib R1 is regarded as being substantially continuous in the tire circumferential direction.

Comparison Tests

Mud-and-snow radial tires of size 275/60R18 112H (Rim size: 8JJ) having the same tread patterns as shown in FIG. 1 except for the specifications given in Table 1 were made, and tested for noise performance and aquaplaning performance.

(1) Noise Performance Test

A 4700 cc four-wheel-drive car provided on all the four wheels with test tires (pressure 200 kpa) was coasted on a smooth asphalt road at a speed of 50 km/h, and the pass-by noise was measured according to the JASO test procedure. The test results are indicated by an index based on Ref.1 being 100, wherein the larger the index number, the lower the pass-by noise level.

(2) Aquaplaning Performance Test

On an asphalt road provided with a 10 mm depth 20 meter long puddle, the test car was run along a 100 meter radius circle and the lateral acceleration (lateral-G) was measured on the front wheel, gradually increasing the speed for entering into the puddle to obtain the average lateral-G for the speed range of from 50 to 80 km/h.

The results are indicated by an index based on Ref.1 being 100, wherein the larger the index number, the better the aquaplaning performance.

TABLE 1

| Tire | Ref. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Outer circumferential main groove 4 | | | | | | | | | |
| configuration | straight | zigzag | zigzag | zigzag | zigzag | zigzag | zigzag | zigzag | zigzag |
| angle α (deg.) | 0 | 5 | 5 | 5 | 5 | 5 | 5 | 3 | 10 |
| Lateral main grooves | | | | | | | | | |
| angle β (deg.) | 0 | 33 | 25 | 45 | 33 | 33 | 33 | 33 | 33 |
| shift K1 (mm) | 0 | 5.5 | 5.5 | 5.5 | 5.5 | 3.5 | 6.5 | 5.5 | 5.5 |
| Longitudinal splitting groove | none | | | | | | | | |
| width W9 (mm) | — | 1.5 | 1.5 | 1.5 | 1.5 | 1.5 | 1.5 | 1.5 | 1.5 |
| depth H9 (mm) | — | 5.5 | 5.5 | 5.5 | 5.5 | 5.5 | 5.5 | 5.5 | 5.5 |
| Lateral splitting groove | none | | | | | | | | |
| angle γ (deg.) | — | 60 | 60 | 60 | 60 | 60 | 60 | 60 | 60 |
| width W10, W11 (mm) | — | 3.7 | 3.7 | 3.7 | 3.7 | 3.7 | 3.7 | 3.7 | 3.7 |
| depth H10, H11 (mm) | — | 6.5 | 6.5 | 6.5 | 6.5 | 6.5 | 6.5 | 6.5 | 6.5 |
| L1a/L1 (%) | — | 39 | 39 | 39 | 45 | 39 | 39 | 39 | 39 |
| L2a/L2 (%) | — | 49 | 49 | 49 | 45 | 49 | 49 | 49 | 49 |
| Noise performance | 100 | 115 | 110 | 120 | 110 | 105 | 117 | 110 | 110 |
| Aquaplaning performance | 100 | 115 | 117 | 105 | 115 | 120 | 110 | 118 | 105 |

The followings were common to all the test tires.

| Axially inner circumferential main groove 3 | |
|---|---|
| configuration | straight |
| groove width W3 | 6.0 mm |
| groove depth H3 | 9.2 mm |
| Axially outer circumferential main groove 4 | |
| groove width W4 | 8.5 mm |
| groove depth H4 | 9.2 mm |
| angle α | 5 degrees |
| Lateral main grooves (5A, 5B) | |
| groove width W5 | 6.4 mm |
| groove depth H5 | 7.0 mm |

The invention claimed is:

1. A pneumatic tire comprising
a tread portion provided between an axially inner circumferential main groove and an axially outer circumferential main groove with a circumferential row of middle tread elements which are circumferentially divided by lateral main grooves, wherein the axially inner circumferential main groove is disposed in a tread center zone having a width of 30% of a ground contacting width between tread edges, and the axially outer circumferential main groove is disposed outside the tread center zone,
each of the middle tread elements divided into four elemental blocks having different configurations, by three splitting grooves which are:
a longitudinal splitting groove extending between the lateral grooves;
an axially inner lateral splitting groove extending axially outwardly from the axially inner circumferential main groove beyond the longitudinal splitting groove and terminating before the axially outer circumferential main groove; and
an axially outer lateral splitting groove extending axially inwardly from the axially outer circumferential main groove beyond the longitudinal splitting groove and terminating before the axially inner circumferential main groove, and
the lateral main grooves include an axially inner lateral main groove and an axially outer lateral main groove which are connected with each other forming a junction, and at the junction, the axially inner lateral main groove and axially outer lateral main groove are circumferentially shifted from each other to form a narrow orifice.

2. The pneumatic tire according to claim 1, wherein the circumferential shift is in a range of from 50 to 90% of the circumferential width of the lateral main grooves at the junction.

3. The pneumatic tire according to claim 1, wherein the lateral main grooves are inclined at angle of from 25 to 45 degrees with respect to the tire circumferential direction, towards the same direction,
the axially inner circumferential main groove is a straight groove, and
the axially outer circumferential main groove is a zigzag groove.

4. The pneumatic tire according to claim 3, wherein said zigzag groove is made up of alternate long inclined parts and short reversely-inclined parts,
the long inclined parts are inclined at an angle of from 3 to 10 degrees with respect to the tire circumferential direction, and
the short reversely-inclined parts are connected with the lateral main grooves.

5. The pneumatic tire according to claim 1, wherein the lateral main grooves are inclined in one direction at angle of from 25 to 45 degrees with respect to the tire circumferential direction, and
one of the lateral splitting grooves is disposed in a circumferential range between 35% and 45% of the middle tread element from one of the circumferential edges of the middle tread element, and the other lateral splitting groove is disposed in a circumferential range between 45% and 55% of the middle tread element from the other circumferential edge of the middle tread element.

6. The pneumatic tire according to claim 1, wherein
said axially inner circumferential main groove and axially outer circumferential main groove are disposed on each side of the tire equator, and
the tread portion is further provided with: a circumferential rib disposed between the axially inner circumferential main grooves; and shoulder blocks divided by additional lateral main grooves extending axially outwardly from the axially outer circumferential main grooves to the tread edges.

7. The pneumatic tire according to claim 6, wherein
said rib is provided with sipes inclined to the same direction as the lateral main grooves.

8. The pneumatic tire according to claim 6, wherein
said shoulder blocks are provided with sipes extending from the circumferential main grooves.

9. The pneumatic tire according to claim 1, wherein
said four elemental blocks are provided with sipes extending from the circumferential main grooves.

* * * * *